US011904324B2

(12) United States Patent
Coulson et al.

(10) Patent No.: US 11,904,324 B2
(45) Date of Patent: Feb. 20, 2024

(54) ICE BLASTING MACHINE WITH DUAL-MODE OPERATION FOR WATER ICE AND DRY ICE

(71) Applicant: Coulson Ice Blast Ltd., Port Alberni (CA)

(72) Inventors: Foster Coulson, Port Alberni (CA); Kristjan Gottfried, Port Alberni (CA)

(73) Assignee: COULSON ICE BLAST LTD., British Columbia (CA)

( * ) Notice: Subject to any disclaimer, the term of this patent is extended or adjusted under 35 U.S.C. 154(b) by 707 days.

(21) Appl. No.: 17/255,049

(22) PCT Filed: Jun. 26, 2019

(86) PCT No.: PCT/CA2019/050884
§ 371 (c)(1),
(2) Date: Dec. 22, 2020

(87) PCT Pub. No.: WO2020/000095
PCT Pub. Date: Jan. 2, 2020

(65) Prior Publication Data

US 2021/0162426 A1 Jun. 3, 2021

Related U.S. Application Data

(60) Provisional application No. 62/690,113, filed on Jun. 26, 2018.

(51) Int. Cl.
*B02C 25/00* (2006.01)
*B02C 1/06* (2006.01)
(Continued)

(52) U.S. Cl.
CPC ................ *B02C 25/00* (2013.01); *B02C 1/06* (2013.01); *B24C 1/003* (2013.01); *B24C 7/0092* (2013.01); *F25C 5/046* (2013.01)

(58) Field of Classification Search
CPC ........... B02C 25/00; B02C 1/06; B24C 1/003; B24C 7/0092; B24C 11/00; F25C 5/046
(Continued)

(56) References Cited

U.S. PATENT DOCUMENTS 2,675,181 A * 4/1954 Tebow .................... F25C 5/046 241/266
4,655,847 A 4/1987 Ichinoseki et al.
(Continued)

FOREIGN PATENT DOCUMENTS

CA 2964016 C 5/2018
DE 102006000510 B3 8/2008
(Continued)

OTHER PUBLICATIONS

Extended European Search Report and Written Opinion dated Feb. 3, 2022 for European Patent Application No. 19825328.8, 10 pages.
(Continued)

*Primary Examiner* — Laura C Guidotti
*Assistant Examiner* — Caleb Andrew Holizna
(74) *Attorney, Agent, or Firm* — Morgan, Lewis & Bockius LLP

(57) ABSTRACT

An ice blasting machine comprising a crusher for crushing water ice; and a crusher-activation mechanism to activate or deactivate the crusher, wherein the crusher is activated to operate in water ice mode and wherein the crusher is deactivated to operate in dry ice mode. An ice-blasting method including activating a crusher to crush water ice when operating in water ice mode and deactivating the crusher when operating in dry ice mode.

7 Claims, 4 Drawing Sheets

(51) Int. Cl.

| | |
|---|---|
| ***B24C 1/00*** | (2006.01) |
| ***B24C 7/00*** | (2006.01) |
| ***F25C 5/04*** | (2006.01) |

(58) Field of Classification Search
USPC .................................... 451/38, 39, 99, 100, 2
See application file for complete search history.

(56) References Cited

U.S. PATENT DOCUMENTS

| | | | | |
|---|---|---|---|---|
| 5,520,572 | A | 5/1996 | Opel et al. | |
| 5,685,499 | A * | 11/1997 | Gimmy | B02C 18/02 241/32 |
| 9,700,989 | B1 * | 7/2017 | Cooper | B24C 1/00 |
| 2011/0104993 | A1 | 5/2011 | Nishimura | |

FOREIGN PATENT DOCUMENTS

| | | | |
|---|---|---|---|
| DE | 202016101964 | U1 | 4/2016 |
| EP | 0316264 | A2 | 5/1989 |
| EP | 2681009 | B1 | 8/2015 |
| WO | 9014927 | A1 | 12/1990 |
| WO | 2014182254 | A1 | 11/2014 |

OTHER PUBLICATIONS

International Search Report dated Sep. 5, 2019 for International Patent Application No. PCT/CA2019/050884, 3 pages.

* cited by examiner

CRUSHER WTIH TEETH ENGAGED IN WATER ICE MODE

CRUSHER WTIH TEETH DISENGAGED IN DRY ICE MODE

WORM GEAR STYLE CRUSHER RETRACTION SYSTEM

LEAD SCREW STYLE CRUSHER RETRACTION SYSTEM

TOOTHED CLUTCH
ENGAGEMENT DETAIL

TOOTHED CLUTCH DISENGAGEMENT SYSTEM
SHOWING BELT DETAIL

REVERSING CAM CLUTCH DISENGAGEMENT SYSTEM
SHOWING BELT DETAIL

ICE BLASTING MACHINE WITH DUAL-MODE OPERATION FOR WATER ICE AND DRY ICE

CROSS REFERENCE TO RELATED APPLICATIONS

This application is a U.S. National Phase of International Application No. PCT/CA2019/050884 filed on Jun. 26, 2019, which claims the benefit of U.S. Provisional Patent Application No. 62/690,113 filed on Jun. 26, 2018 entitled "Ice Blasting Machine with Dual-Mode Operation for Water Ice and Dry Ice", each of which is incorporated by reference herein in its entirety.

TECHNICAL FIELD

The present invention relates to ice blasting machines.

BACKGROUND

Ice blasting machines that use either dry ice (i.e. solid carbon dioxide) or water ice as a blasting medium are known in the art. In some instances, depending on the surface to be cleaned and the substance to be removed, dry ice blasting may be more effective while in other instances water ice blasting may be more effective. In many cases, the ice blasting machine must be brought to the job site, which may mean that two different ice blasting machines may need to be carried to the job site to deal with different surfaces.

An improved ice blasting machine that would address this issue would be highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

Accordingly, one inventive aspect of the present disclosure is an ice blasting machine comprising a crusher for crushing water ice and a crusher-activation mechanism to activate or deactivate the crusher, wherein the crusher is activated to operate in water ice mode and wherein the crusher is deactivated to operate in dry ice mode.

Another inventive aspect of the present disclosure is an ice-blasting method comprising activating a crusher to crush water ice when operating in water ice mode and deactivating the crusher when operating in dry ice mode.

Other aspects of the invention may become apparent from the description and drawings.

BRIEF DESCRIPTION OF THE DRAWINGS

Further features and advantages of the present invention will become apparent from the following detailed description, taken in combination with the appended drawings in which.

It will be noted that throughout the appended drawings, like features are identified by like reference numerals.

DETAILED DESCRIPTION

Figure 2:
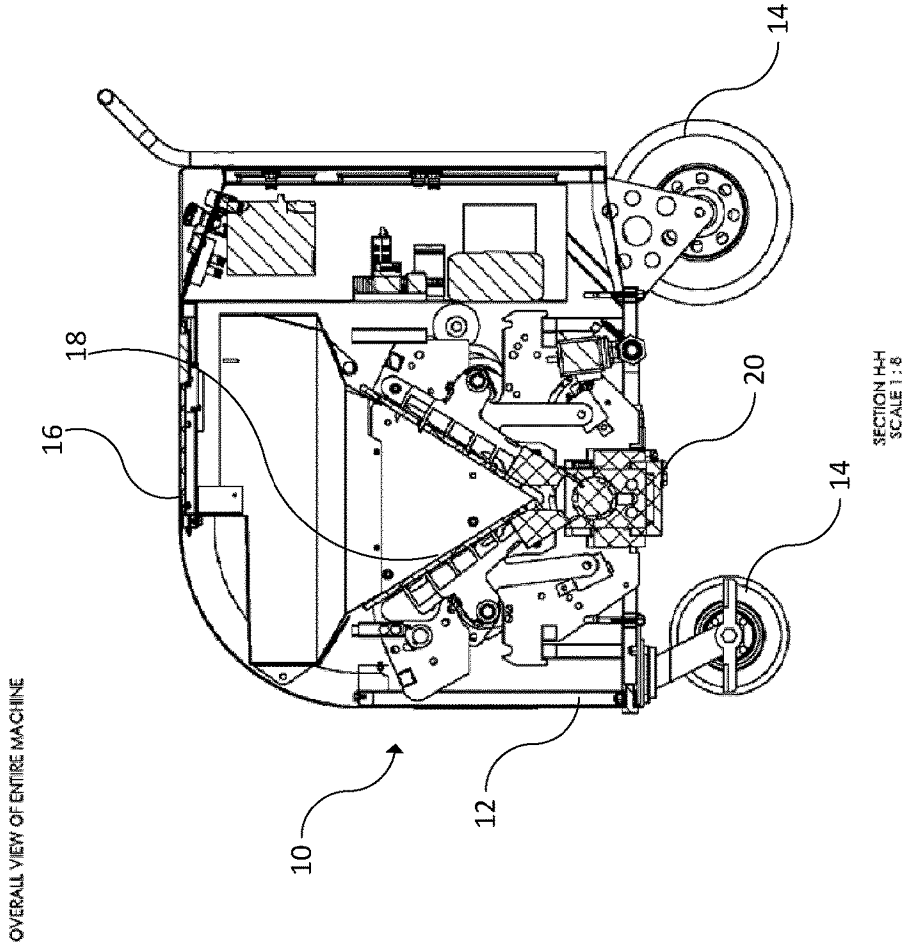
FIG. 2 is a cross-sectional front view of the dual-mode ice blasting machine of FIG. 1.
Figure 1:
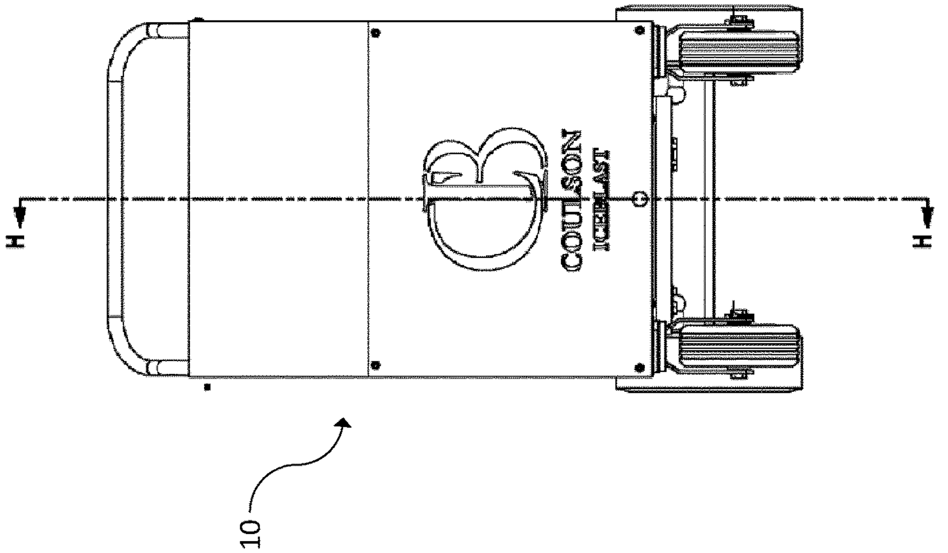
FIG. 1 is a front view of a dual-mode ice blasting machine in accordance with an embodiment of the present invention.

FIGS. 1 and 2 depict a portable dual-mode ice blasting machine denoted by reference numeral 10 in accordance with an embodiment of the present invention. The dual-mode ice blasting machine 10 in the illustrated embodiment comprises a frame 12 and wheels 14 so that ice blasting machine is portable. In the illustrated embodiment, the ice blasting machine does not have an internal ice maker. Rather, ice is loaded via a hatch 16 on the top surface of the ice blasting machine. The ice blasting machine includes an internal crusher 18 that is configured to receive large blocks or chunks of ice and is able to crush the ice down to a useful size, i.e. a size that enables entrainment into a high-speed stream of pressurized air. The ice blasting machine is considered to be "dual-mode" because it is able to independently blast a surface with dry ice and water ice through either a common outlet hose or a pair of outlet hoses, i.e. a first hose dedicated for outputting an airstream carrying dry ice and a second hose dedicated for outputting an airstream carrying water ice. The airstream velocity may be manually or automatically adjustable by regulating the air source, e.g. by controlling an air pump or regulating a valve from a compressed air tank. The mass flow rate of ice may also be adjustable.

FIG. 2 shows the location of the crusher 18. The crusher in the illustrated embodiment is a V-shaped crusher that is composed of a pair of jaws that open and close to crush chunks of ice into smaller pieces of ice. The hopper rests on an agitator 20 or agitation system. The V-shaped crusher is also disclosed in Canadian Patent No. 2,964,016, which is hereby incorporated by reference.

In at least some embodiments, the crusher is activated when operating in water ice mode to enable the ice blasting machine to crush large chunks of ice into smaller bits of ice whereas the crusher is deactivated when operating in dry ice mode.

For the purposes of this specification, the expression “water ice mode” means that the machine is blasting only water ice particles.

For the purposes of this specification, the expression “dry ice mode” means that the machine is blasting only dry ice particles.

It will be appreciated that the ice blasting machine may have a switch, controller, programmable logic controller or processor to switch, either manually or automatically, between water ice and dry ice modes. The switch may be disposed on the handheld nozzle or alternatively on the frame.

Figure 3:
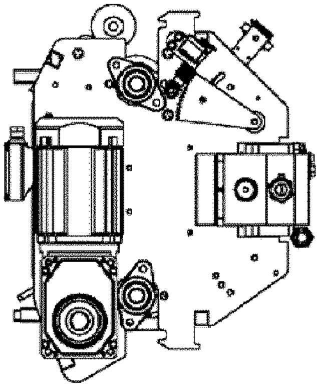
FIG. 3 is a side view of a crusher with its teeth engaged for crushing water ice when operating in water ice mode.
Figure 4:
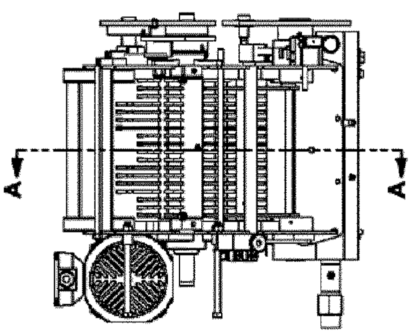
FIG. 4 is a top view of the crusher of FIG. 3.
Figure 5:
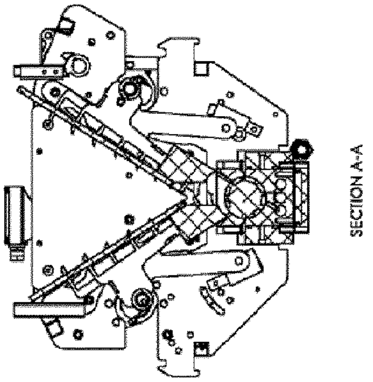
FIG. 5 is a cross-sectional view taken through section A-A in FIG. 4.

FIGS. 3-5 depict the crusher with its teeth engaged when operating in water ice mode. The mechanism includes a hopper agitation cam which alternately lifts and drops the hopper to keep the media (ice) moving in the hopper. In water ice mode the crusher teeth are engaged with the drive motor and move cyclically to crush the ice into sufficiently small pieces to prevent clogging in the discharge hose.

Figure 6:
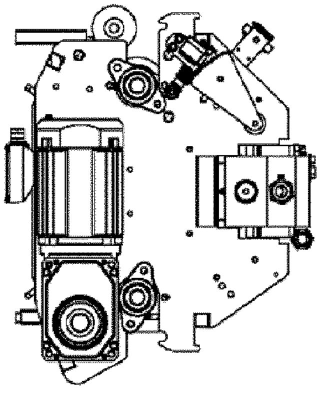
FIG. 6 is a side view of the crusher with its teeth disengaged when operating in dry ice mode.
Figure 7:
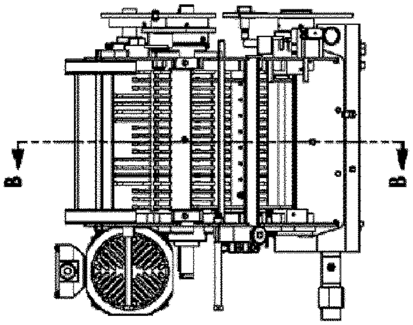
FIG. 7 is a top view of the crusher of FIG. 6.
Figure 8:
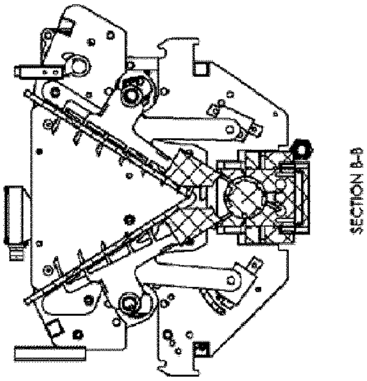
FIG. 8 is a cross-sectional view taken through section B-B in FIG. 7.

FIGS. 6-8 depict the crusher with its teeth retracted or disengaged when operating in dry ice mode. In dry ice mode, the crusher teeth are disengaged from the motor and so do not move, i.e. are immobile. In at least this embodiment, this disengagement is necessary as the dry ice will fill the space between the crusher and will prevent any motion, thereby leading to eventual motor burnout or chain skipping. One side of the crusher teeth is retracted in order to provide an unrestricted path from the hopper to the feeder. The agitation cam system is keyed to the motor driveshaft and thus continues to operate in dry ice mode.

To activate and deactivate the crusher, the ice blasting machine includes a crusher-activation mechanism. Different embodiments of the crusher-activation mechanism are disclosed below.

Figure 9:
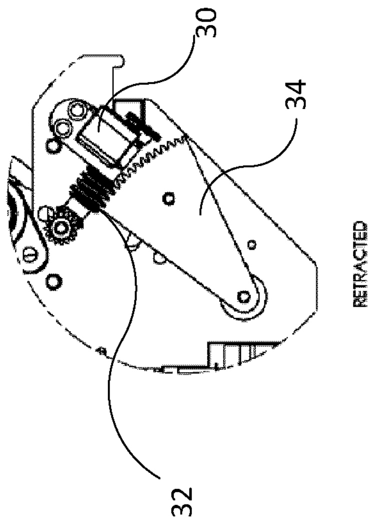
FIG. 9 depicts a worm gear style crusher retraction system in its retracted position.
Figure 10:
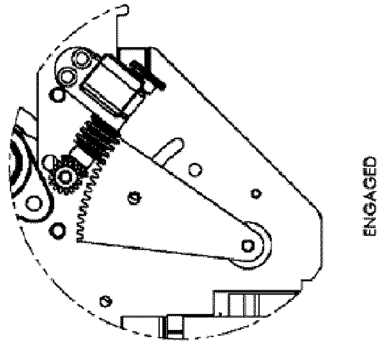
FIG. 10 depicts the worm gear style crusher retraction system in its engaged position.
Figure 11:
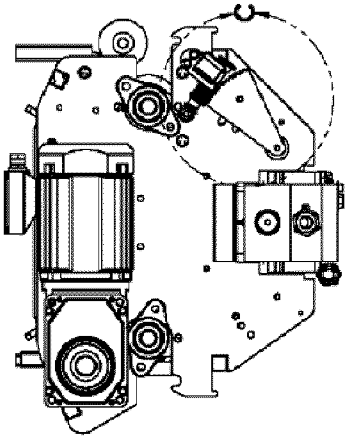
FIG. 11 shows the location of the worm gear style retraction system on the machine.

FIGS. 9-11 depict a worm gear style crusher teeth retraction mechanism with an integral servomotor. This is one example of a crusher-activation mechanism for retracting the crusher teeth. The servomotor 30 turns a worm gear 32 which in turn acts upon a fan plate 34 which has mating gear teeth machined into the outer radius. This moves the slider backwards and forwards.

Figure 12:
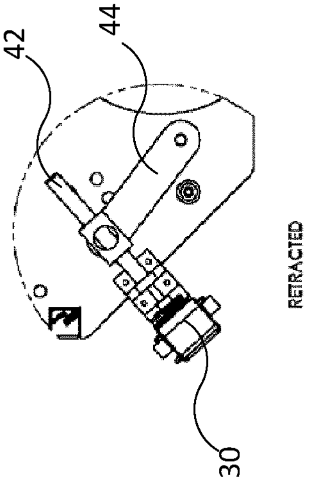
FIG. 12 depicts a lead screw style crusher retraction system in its retracted position.
Figure 13:
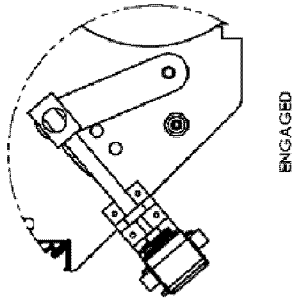
FIG. 13 depicts the lead screw style crusher retraction system in its engaged position.
Figure 14:
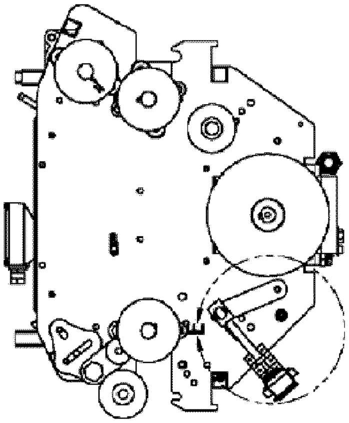
FIG. 14 shows the location of the lead screw crusher retraction system on the machine.

FIGS. 12-14 depict a lead screw style crusher tooth retraction mechanism having a lead screw 42 and an integral servomotor 30. The crusher teeth slider guide 44 can change its angle by turning the lead screw. This moves the slider plate forwards or backwards. Using this mechanism the crusher teeth can be completely pulled out of the way, or partially retracted to allow larger ice particles to fall through in water ice mode.

Figure 15:
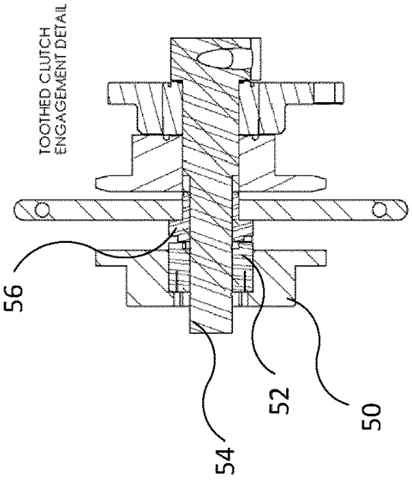
FIG. 15 depicts the toothed clutch engagement mechanism.

FIG. 15 depicts details of a toothed clutch sprocket engagement mechanism on the crank lobe. The sprocket 50 at the far left rides on a first clutch jaw 52 which can freewheel on the crank shaft 54. The second clutch jaw 56 is keyed to the crank shaft and can slide axially to engage the first jaw using the attached shifter levers.

Figure 16:
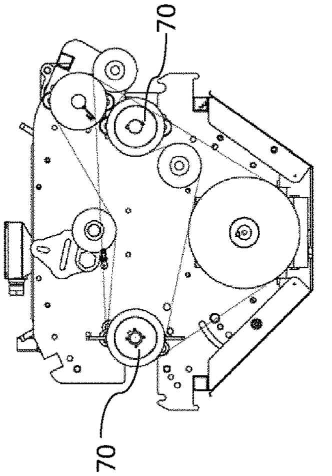
FIG. 16 depicts the toothed clutch disengagement mechanism.
Figure 17:
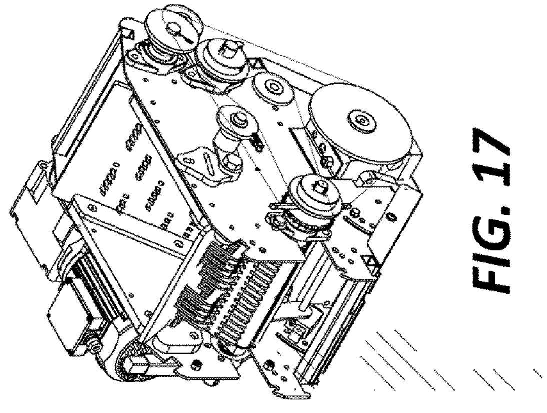
FIG. 17 is an isometric view of the crusher incorporating the clutch engagement and disengagement mechanisms of FIG. 15 and FIG. 16.

FIGS. 16-17 depict a crusher disengagement system belt arrangement for toothed clutch disengagement system. The crusher has two crusher sprockets 70. The drive motor is directly chained to the feeder sprocket and to a freewheeling clutch on one crusher crank lobe. There is a sliding clutch engagement system on this crank lobe that can be in two positions. The first position locks the freewheeling sprocket to the crank lobe and allows the drive motor to turn the crusher. The second position disengages the freewheeling sprocket which allows the drive motor to turn without engaging the crusher teeth. There is a second chain connecting the two crusher teeth shafts which allows there to be only one clutch system on one of the crusher shafts to engage both crusher teeth simultaneously.

Figure 18:
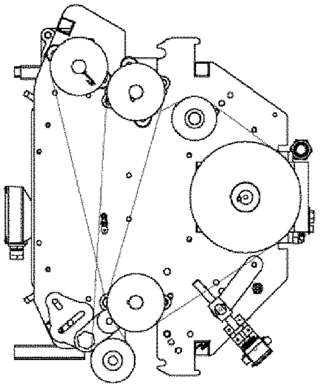
FIG. 18 depicts a reversing cam clutch disengagement mechanism.
Figure 19:
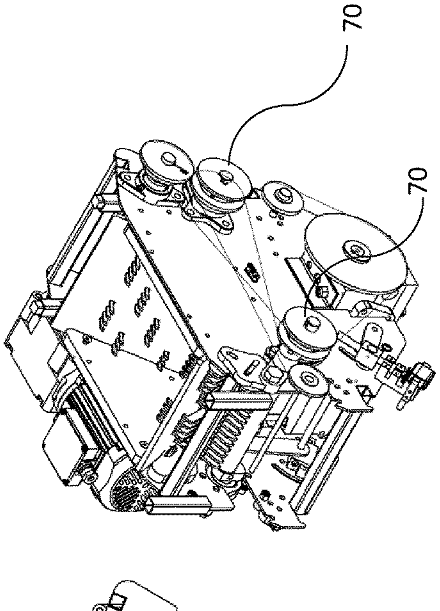
FIG. 19 is an isometric view of the crusher incorporating the disengagement mechanism of FIG. 18.

FIGS. 18-19 depict a crusher disengagement system belt arrangement for reversing cam clutch disengagement system. The twin crusher sprockets 70 ride on cam clutch bearings and so will only engage with the crank lobes when turning in one direction. There is a second timing chain to maintain the relative phase angle between the respective crusher sides. In this arrangement the crusher will move when the motor is turning forwardly in water ice mode. The crusher sprockets will freewheel when the motor is running in reverse and the crusher teeth will not move, which is necessary in dry ice mode.

The various embodiments of the dual-mode ice-blasting machine disclosed in this specification enable a user to perform a novel ice-blasting method. The method entails activating a crusher to crush water ice when operating in water ice mode and deactivating the crusher when operating in dry ice mode.

It is to be understood that the singular forms “a”, “an” and “the” include plural referents unless the context clearly dictates otherwise. Thus, for example, reference to “a device” includes reference to one or more of such devices, i.e. that there is at least one device. The terms “comprising”, “having”, “including”, “entailing” and “containing”, or verb tense variants thereof, are to be construed as open-ended terms (i.e., meaning “including, but not limited to,”) unless otherwise noted. All methods described herein can be performed in any suitable order unless otherwise indicated herein or otherwise clearly contradicted by context. The use of examples or exemplary language (e.g. “such as”) is intended merely to better illustrate or describe embodiments of the invention and is not intended to limit the scope of the invention unless otherwise claimed.

While several embodiments have been provided in the present disclosure, it should be understood that the disclosed devices and systems might be embodied in other specific forms without departing from the scope of the present disclosure. The present examples are to be considered as illustrative and not restrictive, and the intention is not to be limited to the details given herein. For example, the various devices and systems may be combined or integrated in another system or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. An ice blasting machine comprising:

a hatch through which water ice or dry ice is loaded into a single hopper of the ice blasting machine;

a crusher for crushing the water ice;

a crusher-activation mechanism to activate or deactivate the crusher to crush the water ice when the ice blasting machine is blasting only the water ice, wherein the crusher is activated to operate when the ice blasting machine is blasting only the water ice particles and wherein the crusher is deactivated when the ice blasting machine is blasting only the dry ice such that the dry ice is not crushed by the crusher;

an air pump or compressed air tank for producing a high-speed stream of pressurized air;

an outlet hose for outputting the water ice or the dry ice that has been entrained into the high-speed stream of pressurized air from the air pump or the compressed air tank; and a switch to switch between blasting only the water ice and blasting only the dry ice, wherein the switch causes the crusher-activation mechanism to activate or deactivate the crusher.

2. The ice blasting machine of claim 1 wherein the crusher is a V-shaped crusher having two jaws.

3. The ice blasting machine of claim 2 wherein the crusher-activation mechanism comprises a reversing cam clutch disengagement system.

4. The ice blasting machine of claim 2 wherein the crusher-activation mechanism comprises a worm gear style crusher teeth retraction mechanism.

5. The ice blasting machine of claim 2 wherein the crusher-activation mechanism comprises a lead screw style crusher tooth retraction mechanism.

6. The ice blasting machine of claim 1 further comprising a portable frame having wheels.

7. An ice-blasting method comprising:

providing an ice blasting machine according to claim 1;

activating the crusher to crush the water ice the ice blasting machine is blasting only water ice; and deactivating the crusher the ice blasting machine is blasting only dry ice.

* * * * *